F. & A. SCHNEIDER.
PLOW.
APPLICATION FILED JUNE 2, 1911.
1,052,283.
Patented Feb. 4, 1913.
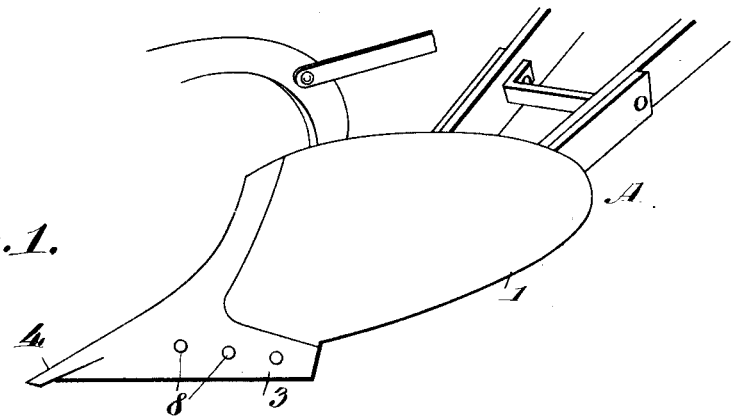
Fig. 1.
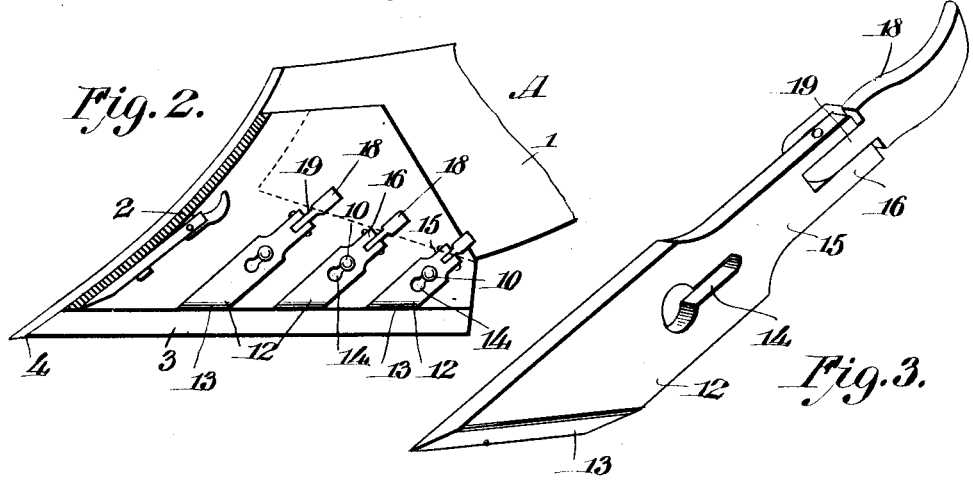
Fig. 2.
Fig. 3.
Fig. 4.
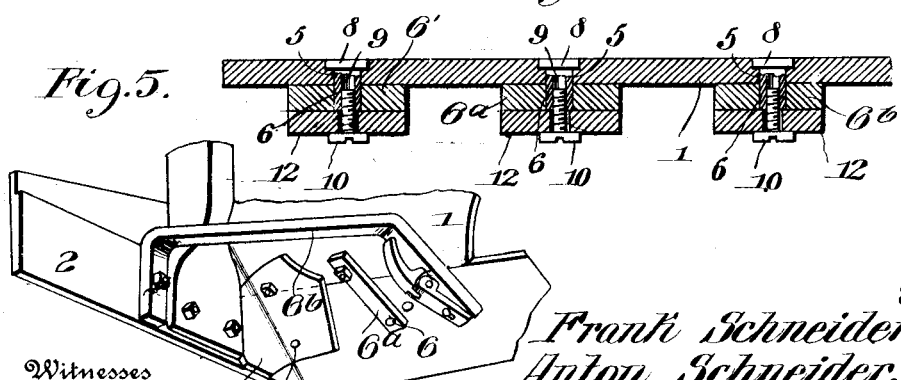
Fig. 5.
Inventors
Frank Schneider,
Anton Schneider.
Witnesses
By Victor J. Evans
Attorney

UNITED STATES PATENT OFFICE.

FRANK SCHNEIDER AND ANTON SCHNEIDER, OF MEADOW, SOUTH DAKOTA.

PLOW.

1,052,283.  Specification of Letters Patent.  Patented Feb. 4, 1913.

Application filed June 2, 1911. Serial No. 630,810.

*To all whom it may concern:*

Be it known that we, FRANK SCHNEIDER and ANTON SCHNEIDER, citizens of the United States, residing at Meadow, in the county of Perkins and State of South Dakota, have invented new and useful Improvements in Plows, of which the following is a specification.

The present invention relates to certain novel and useful improvements in plows, and has particular application to means for detachably connecting or fastening the share to the plow.

In carrying out our invention, it is our purpose to provide a clamping device whereby the plow share may be readily, quickly and conveniently attached to or detached from the plow, thereby obviating the employment of bolts in securing the share.

It is also our purpose to provide an attachment embodying in its construction the desired features of simplicity, durability, strength and efficiency.

With the above recited objects and others of a similar nature in view, the invention consists in the construction, combination and arrangement of parts, set forth in and falling within the scope of the appended claims.

In the accompanying drawing; Figure 1 is a perspective view of a plow equipped with our improvements. Fig. 2 is a vertical sectional view through the same showing our improved clamping devices. Fig. 3 is a perspective view of one of our improved clamping devices. Fig. 4 is a horizontal sectional view showing the construction and the manner of securing the clamping bolts, and Fig. 5 is a fragmentary perspective view of the plow.

Referring now to the accompanying drawing in detail, the letter A indicates the plow as an entirety, comprising the mold board 1, the land side 2 and the removable plow share 3, the latter being provided with the plow point 4, as usual.

In order to attach the plow share to the mold board, we provide the body of the share with a suitable number of apertures 5 designed when the share is placed in position relatively to the mold board to coincide or aline with similar apertures or bores 6 in a frog 6' and a brace bar 6ª secured to the mold board 1, and a tie bar 6ᵇ carried by the land side 2, as clearly illustrated in Fig. 5. Extending through these alining apertures or bores and connecting the share to the plow are our improved bolts which are shown in detail in Fig. 4. Each of such bolts comprises a head 8 having a tubular interiorly threaded shank 9 designed to receive the threaded shank of a screw 10, the latter having the usual head. When in use, the tubular shank portions of the bolts are projected through the bores in the share alining with the bores in the frog, brace bar and tie bar respectively from the outside, and the shank of the screw then threaded into the tubular shank of the socket. Each of the improved clamping devices comprises a plate or blade 12 having its edge 13 beveled to correspond to the edge of the share or point, as the case may be, said plate or blade having a keyhole slot 14 extending therethrough for the reception of the bolts heretofore referred to. The narrow end 15 of the plate or blade is bifurcated as at 16 for the reception of the lug 19 of a cam lever 18, a pivot pin connecting the lug with the bifurcated portion of the blade or plate and thereby pivotally connecting the lug to the latter. It will be seen that we provide a series of clamps, said clamps differing in size as to length one from the other, the clamps nearest the point or forward portion of the share being relatively longer than those back of it or toward the rear of the plow share.

In employing our invention, the apertures or bores in the side of the plow share are preferably countersunk to receive the heads 8 of the tubular shanks, and after the shanks have been projected through the openings, the screws 10 may be threaded therein. The clamping member is then placed in position, the projecting portion of the bolt or screw extending through the keyhole slot, the plate or blade being shifted so that the shank of each bolt lies in the narrowed portion of its slot. The threaded screw may then be tightened in the tubular shank to the desired extent and the cam lever swung downward to bind the clamp firmly in position. When the clamps have been so connected, the share will be held securely, rigidly and firmly in position. Should it be desired to remove the clamping devices, it is only necessary to swing the cam levers outward, when the clamping plates or bars may be readily slipped from the bolts.

It will be seen that we have provided an exceedingly simple yet effective means for readily attaching and detaching the share to the plow. It will, of course, be understood that any desired number of clamping devices may be employed, and, furthermore, that each edge of the clamping plate opposite the end carrying the lever is beveled or shaped to conform to the adjacent edge of the share or point, as the case may be.

While we have herein shown and described a further embodiment of our invention, we wish it to be understood that we do not limit ourselves to the precise details of construction, as modification and variation may be made without departing from the spirit of the invention or exceeding the scope of the appended claims.

We claim:

1. The combination with a plow, of a share, means for detachably connecting the share to the plow, said means comprising a plurality of bolt members connecting the share to the plow and each comprising a tubular interiorly threaded shank and an exteriorly threaded shank adapted to be disposed within the interiorly threaded shank, and a series of clamping devices similar in construction but differing as to length and detachably engaged with said bolt members.

2. The combination with a plow, of a share, means detachably connecting the share to the plow, said means comprising a plurality of bolts, each comprising an interiorly threaded tubular shank portion and a screw threaded therein, a clamping device engaging each of said bolts, said clamping device comprising a slotted plate or blade and a pivoted clamp lever for the plate or blade, said clamping devices being similar in construction but differing as to length and having beveled edges conforming to the adjacent edge of the plow share.

3. The combination with a plow, of a share, means detachably connecting the share to the plow, said means comprising a plurality of studs projecting through openings in the share, and a clamp for each of said studs comprising a body portion having a keyhole slot therein and adapted to receive said studs, and a pivoted clamp lever carried by the body portion of each clamp and adapted to clamp the latter to the plow.

In testimony whereof we affix our signatures in presence of two witnesses.

FRANK SCHNEIDER.
ANTON SCHNEIDER.

Witnesses:
C. A. BENNNETT,
O. W. OLSON.